(12) United States Patent
Salenbien et al.

(10) Patent No.: US 9,494,233 B2
(45) Date of Patent: Nov. 15, 2016

(54) LOW TENSION PISTON RINGS AND METHOD FOR MANUFACTURING THE SAME

(71) Applicant: FEDERAL-MOGUL CORPORATION, Southfield, MI (US)

(72) Inventors: Gregory Salenbien, Britton, MI (US); Miguel Azevedo, Ann Arbor, MI (US); Matthew Belford, Milan, MI (US)

(73) Assignee: Federal Mogul Corporation, Southfield, MI (US)

( * ) Notice: Subject to any disclaimer, the term of this patent is extended or adjusted under 35 U.S.C. 154(b) by 0 days.

(21) Appl. No.: 15/002,753

(22) Filed: Jan. 21, 2016

(65) Prior Publication Data

US 2016/0138714 A1    May 19, 2016

Related U.S. Application Data

(62) Division of application No. 13/827,255, filed on Mar. 14, 2013, now Pat. No. 9,261,190.

(51) Int. Cl.
*F16J 9/00* (2006.01)
*F16J 9/02* (2006.01)
*B23P 15/06* (2006.01)
*F16J 9/14* (2006.01)

(52) U.S. Cl.
CPC *F16J 9/02* (2013.01); *B23P 15/06* (2013.01); *B23P 15/065* (2013.01); *F16J 9/14* (2013.01); *Y10T 29/49284* (2015.01)

(58) Field of Classification Search
CPC ............... F16J 9/00; F16J 9/02; F16J 9/064; F16J 9/92
See application file for complete search history.

(56) References Cited

U.S. PATENT DOCUMENTS

| | | | | |
|---|---|---|---|---|
| 3,834,719 A | * | 9/1974 | Shin ........................ | F16J 9/02 277/451 |
| 4,346,685 A | * | 8/1982 | Fujikawa ................. | F02F 3/00 123/193.6 |
| 5,251,915 A | * | 10/1993 | Meernik ................. | F16J 9/062 277/457 |
| 2009/0174150 A1 | * | 7/2009 | Smith ..................... | F16J 9/206 277/442 |

* cited by examiner

*Primary Examiner* — Gilbert Lee
(74) *Attorney, Agent, or Firm* — Robert L. Stearns; Dickinson Wright, PLLC

(57) ABSTRACT

The invention provides a low tension piston ring having a finished outer diameter and negligible tangential tension. The method includes the steps of machining a stock bar to an initial outer diameter slightly greater than the finished outer diameter of the piston ring, finishing the initial outer diameter of the stock bar to a rounded profile having a nominal diameter equal to the finished outer diameter, and machining the stock bar to the preferred cross-section. Dykes-type piston rings can have keystone or semi-keystone shaped cross-sections. The method continues by detaching the piston ring from the stock bar using a parting tool in response to completing all tension inducing operations including the steps recited above. The method continues with the steps of lapping the piston ring to a final longitudinal thickness and cutting the piston ring longitudinally to form a final gap.

6 Claims, 4 Drawing Sheets

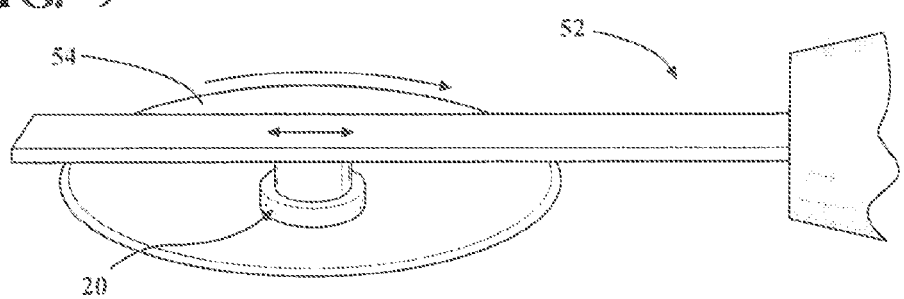
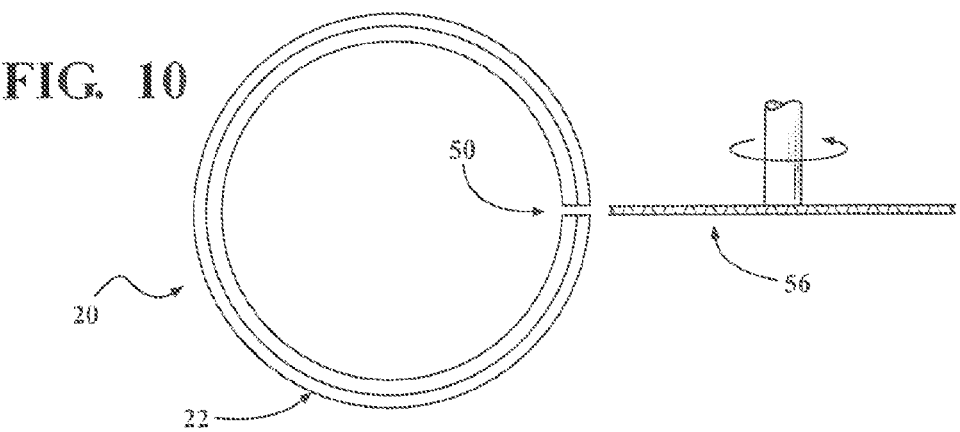
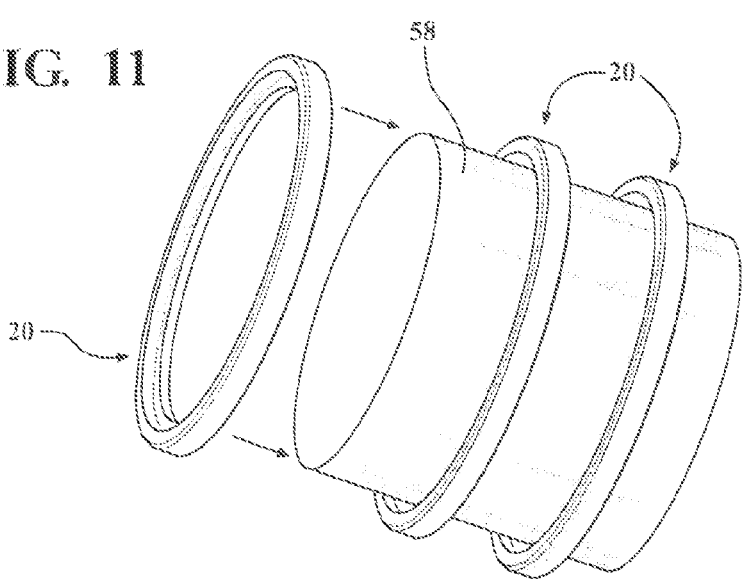

LOW TENSION PISTON RINGS AND METHOD FOR MANUFACTURING THE SAME

This Divisional patent application claims priority to U.S. Utility application Ser. No. 13/827,255, filed Mar. 14, 2013, and is incorporated herein by reference.

TECHNICAL FIELD

The subject invention provides a method for manufacturing a low tension piston ring, specifically a dykes-type piston ring having a finished outer diameter and negligible tangential tension.

BACKGROUND

Piston rings are a critical component of an internal combustion engine. The engine includes at least one cylinder and piston. Piston rings are metallic seals disposed between the cylinder wall and the piston to seal the combustion chamber from the crankcase and facilitate heat transfer from the piston to the cylinder. Other functions of piston rings are to prevent the oil not needed for lubrication from passing from the crankcase to the combustion chamber and to provide a uniform oil film on the cylinder bore surface. To achieve this, the piston rings must remain in contact with the cylinder and the piston. Radial contact is generally achieved by means of the inherent spring force of the piston ring. Piston rings are also employed as metallic seals for rotating shafts and are used both as contracting and expanding seals.

Today, piston rings are typically manufactured in one of two ways. In one method, the piston rings are cast as individual rings in a noncircular shape. Such rings are then typically machined to the required shape by means of double cam turning, a process in which the ring blank, already axially ground, is cam turned simultaneously on the inside and outside diameters. After a segment equivalent to the free gap is cut from the piston ring, it assumes the free shape that will give it the required radial pressure distribution when fitted into the cylinder. Once inside the cylinder, the piston ring exerts the predefined radial pressure against the cylinder wall. Besides using double cam turning, ring blanks may also be shaped by machining the inside and outside diameters separately. This involves cam turning the outside diameter of the noncircular blank and machining the inside diameter with the piston ring in the compressed state. The free gap is cut out in a step between the outer diameter and inner diameter machining.

According to a different method, steel piston rings are made from a profiled wire. The rings are first coiled into a circular shape and then the gap is cut out. The necessary shape is obtained using a heat treatment process in which the rings are mounted onto an arbor appropriately designed to impart the required radial pressure distribution. Profiling of the outer diameter is carried out, depending on the piston ring design, on automatic outer diameter lathes or profile grinding machines using profile cutting tools.

The problem with manufacturing piston rings according to the methods described above is that the piston rings are produced with residual tangential tension. Production of piston rings with residual tangential tension is problematic because such piston rings have a tendency to twist or warp. Such ring twist or warp may lead to excessive oil consumption and blow-by, a condition where combustion gasses escape from the combustion chamber by passing along the piston between the piston rings and the cylinder wall. Accordingly, piston rings with residual tangential tension may adversely affect the efficiency, the performance, the emissions, and/or the reliability of the engine.

Methods aimed at producing piston rings with reduced tendency to twist or warp have been developed. One such method includes the step of heat treating a stock bar made of cast iron at a high temperature, for example 1100° Fahrenheit (593.33° Celsius), to remove foundry strains and hard spots. After the stock bar is heat treated, piston ring blanks are cut from the stock bar. Once the piston ring blanks are detached from the stock bar, the method continues with the steps of conventional machining and finishing the piston ring blank to final outer and inner diameters. The last step is cutting a final free gap into the piston ring. Although this method produces rings having less of a tendency to twist or warp, significant tangential tension still remains in the piston rings.

What is needed is a method of manufacturing piston rings wherein only a negligible amount of residual tangential tension remains in the finished products. Without residual tension, the rings will not have a tendency to twist or warp. Residual tension is especially a concern with piston rings with unconventional cross-sections, such as dyke-type piston rings which have an L-shaped cross-section.

Dykes type piston rings allow for better sealing at higher engine speeds and combustion pressures. However, the asymmetrical shape of the dykes type piston ring results in a piston ring that is more prone to twist or warp than conventional piston rings. Accordingly, there is a need for piston rings, particularly dykes-type piston rings with negligible tangential tension.

SUMMARY OF THE INVENTION

In accordance with a preferred embodiment of the invention, a piston ring is detached from a stock bar using a parting tool after completing all tension inducing operations including the steps of machining the stock bar to the initial outer diameter, finishing the stock bar to a predetermined profile, and machining the stock bar to a predetermined cross-section. The piston ring is not separated from the stock bar until after all of the machining and finishing steps have been completed. In this manner, the stresses associated with the machining and finishing operations are borne by the thicker stock bar before the piston ring is separated.

As to dykes-type piston rings in particular, the subject invention can provide a dykes-type piston ring including an annular ring body having a measurable tangential tension ranging from zero to 25 Newtons in a free and uncompressed state. In accordance with this design, the dykes type piston ring defines a final gap having a gap width measurable between a pair of lateral faces ranging from zero to 0.4 millimeters when the annular ring body is in its free and uncompressed state.

These and other features and advantages of the present invention will be readily appreciated, as the same becomes better understood by reference to the following detailed description when considered in connection with the accompanying drawings.

BRIEF DESCRIPTION OF THE DRAWINGS

FIG. 9 is a perspective view illustrating an exemplary step of lapping the piston ring to a final longitudinal thickness;

FIG. 10 is a perspective and elevation view illustrating an exemplary step of cutting the piston ring longitudinally to form a final gap; and FIG. 11 is a perspective view illustrating an exemplary step of installing the piston ring on a mandrel to size the final gap to a predetermined dimension during heat treating.

DETAILED DESCRIPTION OF THE EMBODIMENT

Figure 12:
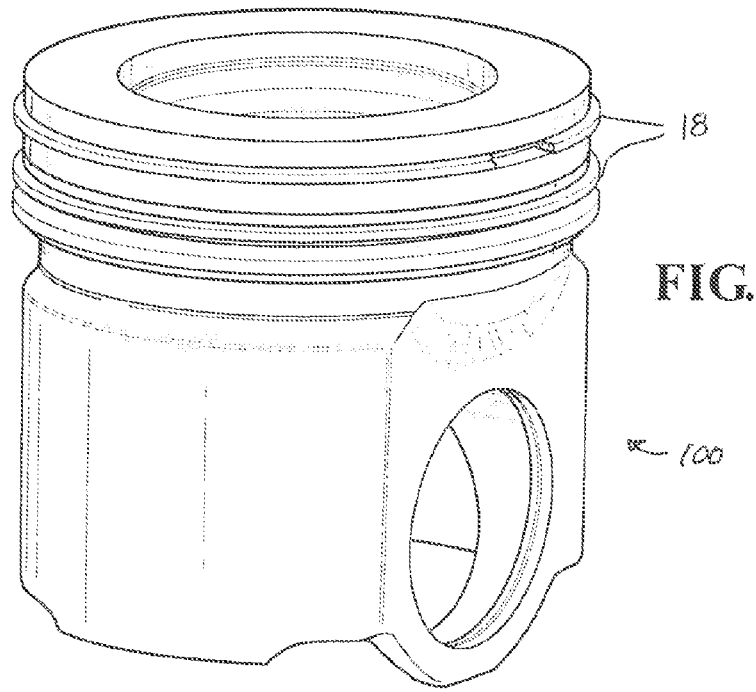
FIGS. 12 and 13 illustrate exemplary pistons with traditional piston rings and with dykes-type piston rings, respectively.
Figure 13:
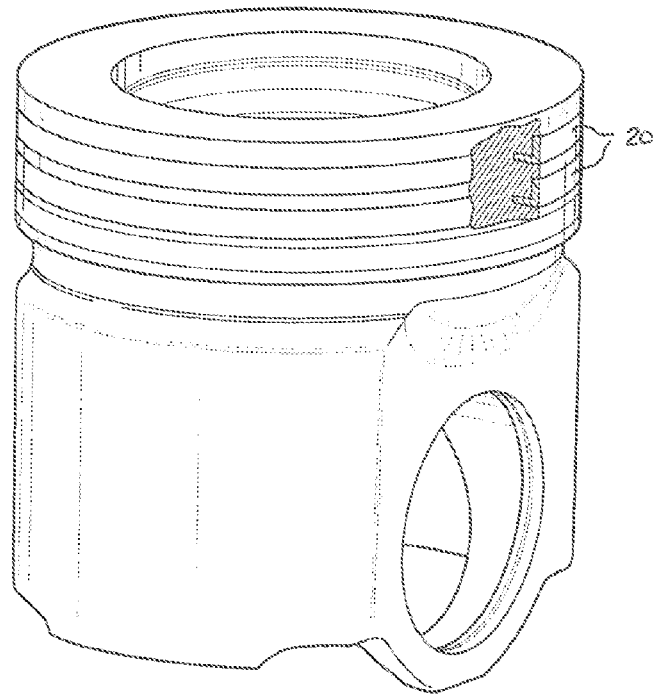

FIG. 12 illustrates a conventional piston 100 with traditional piston rings 18 mounted on it. FIG. 13 illustrates a piston 200 with dykes-type piston rings 20 positioned on it.

Figures 1, 2:
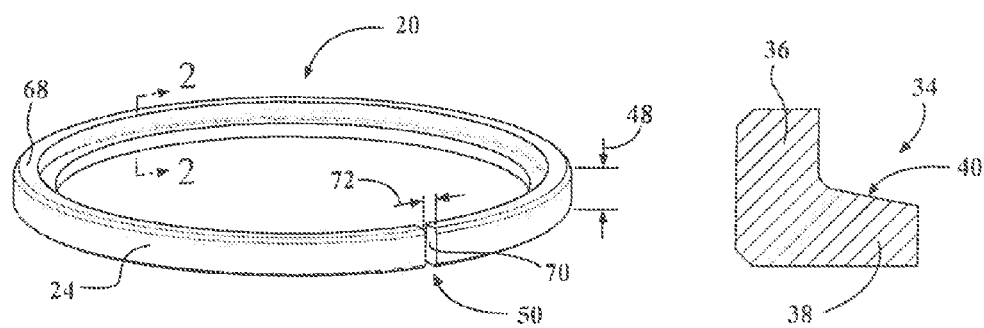
FIG. 1 is a perspective view of an exemplary dykes-type piston ring.
FIG. 2 is a cross-sectional view of the exemplary dykes-type piston ring.

In the Figures, like numerals indicate corresponding parts throughout the several views. In FIGS. 1 and 2, a dykes-type piston ring 20 having a finished outer diameter is presented. It should be appreciated that the piston ring 20 is circular in shape and has a circumference 24. The finished outer diameter extends along the circumference 24.

Figure 4:
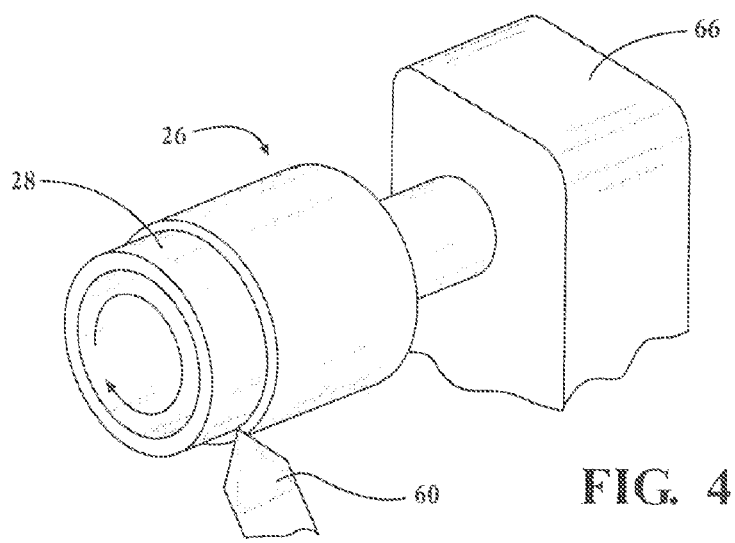
FIGS. 4-6 are perspective views illustrating steps of machining a stock bar to form a piston ring.
Figure 5:
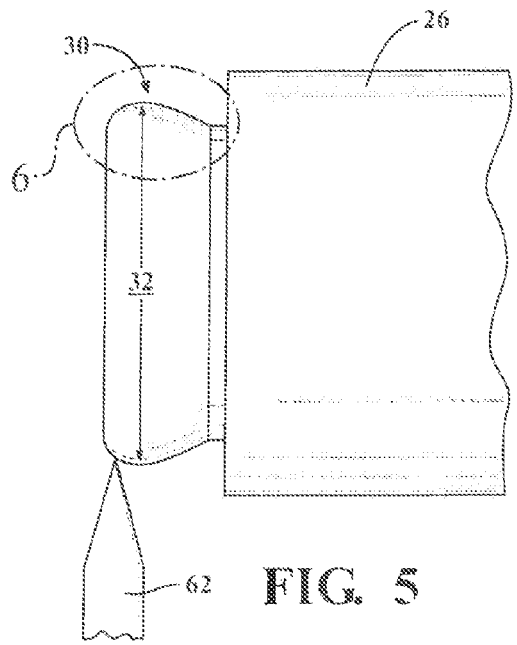
Figure 6:
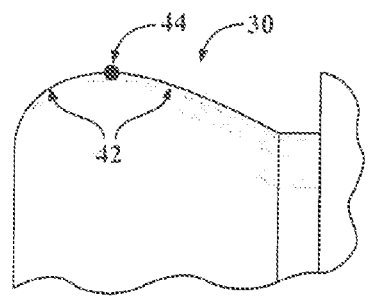
Figure 7:
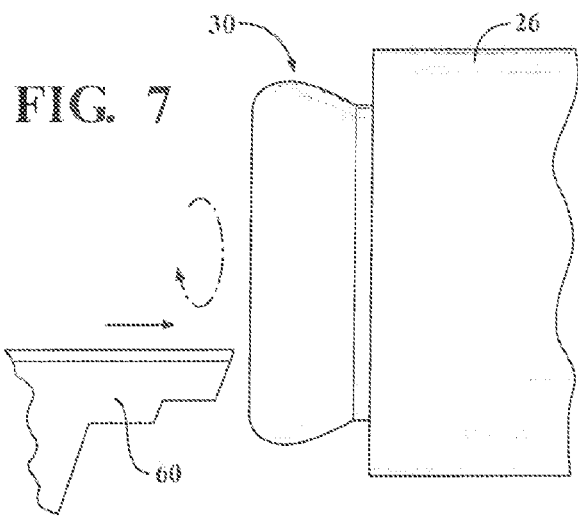
FIG. 7 is a perspective and elevation view illustrating an exemplary step of machining the stock bar to an L-shaped cross-section.

A preferred method embodiment of the subject invention is shown in FIGS. 4-6. The method includes the steps of machining a stock bar 26 to an initial outer diameter 28 slightly greater than the finished outer diameter of the piston ring 20, finishing the initial outer diameter of the stock bar 26 to a predetermined profile 30 having a nominal diameter 32. The diameter 32 is equal to the finished outer diameter 22. The stock bar 26 is also machined to form a structure with an L-shaped cross-section. The method continues with the step of detaching the piston ring 20 from the stock bar 26 in response to completing all tension inducing operations including the steps of machining the stock bar 26 to the initial outer diameter 28, finishing the stock bar 26 to a predetermined profile 30, and machining the stock bar 26 to an L-shaped cross-section 34.

Figure 3:
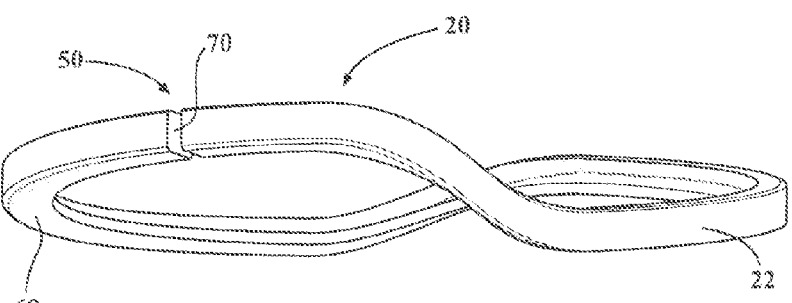
FIG. 3 is a perspective view of an exemplary dykes-type piston ring experiencing a condition known as piston ring warp or piston ring twist.

It has been found that machining and finishing operations typically leave residual tensile forces in thin work pieces such as piston rings. This residual tension arises in a tangential direction with respect to the circumference of the piston rings. As a result, the piston rings are prone to twist or warp around the circumference when constrained in the cylinder of an internal combustion engine. This is shown in exaggerated form in FIG. 3.

With the present invention where the piston ring is not separated from the stock bar 26 until after all of the machining and finishing steps have been completed, the stresses associated with the machining and finishing operations are borne by the thicker and more rigid stock bar 26. It has been found that the tangential tension induced by the machining and finishing operations can be better controlled and minimized in this manner. As a result, the piston ring 20 has only a negligible amount of tangential tension when it is detached from the stock bar 26 in comparison to the prior art.

Piston ring twist or warp is particularly harmful in applications that utilize dykes-type piston rings due to the asymmetrical ("L-shaped") cross-sectional shapes of the rings.

According to one aspect of the subject invention for manufacturing dykes-type piston rings, the method step of machining the stock bar to an L-shaped cross-section may include machining a lip section extending longitudinally and a tail section extending radially inwardly from the lip section. The tail section may be machined to present a keystone shaped cross section defined by one or two inwardly tapering sides.

The method of finishing the initial outer diameter of a stock bar to a predetermined profile having a nominal diameter equal to the finished outer diameter may include finishing the initial outer diameter of the stock bar to a predetermined profile having a variety of shapes. The predetermined profile may have a rounded shape. With a symmetrical or asymmetrical curve profile. For example, as shown in FIG. 6, the exemplary rounded profile asymmetrical curve profile can be defined by a pair of arcs 42 converging at a tangent point 44. The arcs 42 may have different radii. Alternatively, the predetermined profile may have a flat linear shape arranged along the longitudinal direction or sloped at an angle relative to the longitudinal direction. Regardless of the shape of the predetermined profile, the term "nominal diameter", as it is used herein, designates the maximum outer diameter of the predetermined profile.

In one preferred embodiment, the step of machining a stock bar 26 to an initial outer diameter 28 slightly greater than the finished outer diameter 22 of the piston ring 20 may include machining the stock bar 26 such that the initial outer diameter 28 is between 0.4 mm and 3.0 mm larger than the finished outer diameter 22 of the piston ring 20. In this way, the profiling step may be completed more quickly as less material is removed by profiling when the initial outer diameter 28 of the stock bar 26 is close to the finished outer diameter 22 of the piston ring 20. Additionally, the profiling step induces less tangential tension on the stock bar 26 when only a small thickness of material has to be removed.

The method may further include the steps of lapping the piston ring 20 to a final longitudinal thickness and cutting the piston ring 20 longitudinally to form a final gap 50. It should be appreciated that the lapping step may include rubbing the piston ring 20 with an abrasive. The lapping step may include using a dual action lapping machine (not shown) having a rotating lapping pad presenting an abrasive surface. The piston ring and the lapping pad may be rotated in opposite directions and the piston ring 20 may be reciprocated back and forth in a transverse direction across the rotating lapping pad.

As shown in FIGS. 9 and 10, the cutting step may include using a circular saw blade 56 to make a longitudinal cut through the entire L-shaped cross-section of the piston ring 20 to form the final gap 50. The final gap 50 need only be sufficient in size so as to prevent end butting of the piston ring 20 at the operational temperatures of the engine. Accordingly, the final gap 50 of the dykes-type piston ring 20 produced by this method may be many times smaller than the final gap of conventional piston rings.

In accordance with the subject invention, the method may further include the step of heat treating the piston ring 20 by placing the piston ring 20 in a non-oxidizing atmosphere between 400-450° Celsius to relieve any residual tension left in the piston ring 20. The step of heat treating the piston ring 20 in a non-oxidizing atmosphere may be achieved by baking the piston ring 20 in an oven filled with a non-oxidizing gas such as nitrogen. The method may further include the step of installing the rings on a mandrel 58 to size the final gap 50 to a predetermined dimension during the heat treating step. This is shown in FIG. 11.

Figure 8:
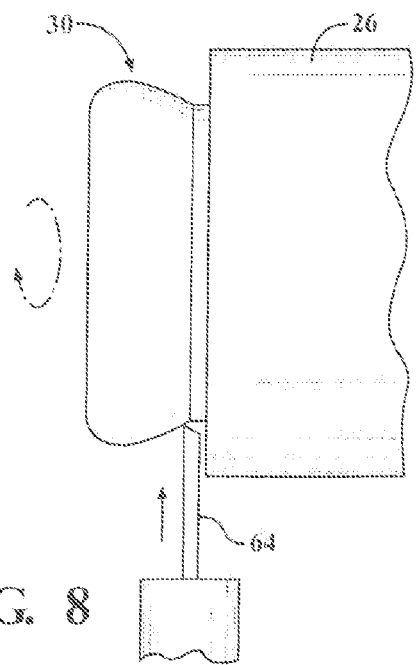
FIG. 8 is a perspective and elevation view illustrating an exemplary step of detaching the piston ring from the stock bar.

The method step of machining the stock bar to the initial outer diameter may include turning the stock bar relative to a machining tool. Similarly, the step of finishing the initial outer diameter to a predetermined profile may include turning the stock bar 26 relative to a profiling tool 62 (FIG. 5). The step of machining the stock bar 26 to the L-shaped cross section may include turning the stock bar 26 relative to a machining tool 60, and the step of detaching the piston ring 20 from the stock bar 26 may include turning the stock bar 26 relative to a parting tool 64 (FIG. 8). As the term is used herein, turning is a specific machining process wherein the piston ring is rotated relative to the tool using a lathe. It should be appreciated that the machining, finishing, and parting steps provided are not limited to turning and can be accomplished using a variety of other tools and operations.

A variety of materials have been found to be suitable for the manufacture of piston rings 20. According to an aspect of the subject invention, the stock bar 26 can be made of a fine grained spheroidal cast iron. However, it is envisioned that other materials may be used.

It should be appreciated that the method of the subject invention applies not only to the manufacture of low tension dykes-type piston rings, but to the manufacture of other types of low tension piston rings as well. Accordingly, a method for manufacturing a low tension piston ring having a finished outer diameter is also provided. The method includes the steps of machining a stock bar to an initial outer diameter slightly greater than the finished outer diameter of the piston ring, finishing the initial outer diameter of the stock bar to a predetermined profile having a nominal diameter equal to the finished outer diameter, and machining the stock bar to a predetermined cross-section. The method continues with the step of detaching the piston ring from the stock bar in response to completing all tension-inducing operations. These operations include machining the stock bar to an initial outer diameter, finishing the stock bar to a predetermined profile, and machining the stock bar to a predetermined cross-section. According to one aspect of this method, the step of machining a stock bar to an initial outer diameter slightly greater than the finished outer diameter of the piston ring may include finishing the initial outer diameter of the stock bar to a predetermined profile having a rounded shape. According to another aspect of this method, the step of machining the stock bar to a predetermined cross-section may include machining the stock bar to a keystone shaped cross-section or a semi-keystone shaped cross-section.

The method described above produces a novel dykes-type piston ring 20 having unique properties. As shown in FIGS. 1 and 2, the dykes-type piston ring 20 that is produced includes an annular ring body 68 presenting a generally L-shaped cross-section 34. The L-shaped cross-section 34 is comprised of and defined by a lip section 36 extending longitudinally relative to the ring body 68 and a tail section 38 having a pair of sides 40 extending radially inwardly from the lip section 36. The annular ring body 68 also presents a pair of lateral faces 70 defining a final gap 50 therebetween. It should be appreciated that the final gap 50 is created by the method step of cutting the detached piston ring 20 longitudinally or discussed above. The pair of lateral faces 70 is arranged such that they face one another in an opposing spaced relationship. The annular ring body 68 has little or no tangential tension, ranging from zero to 25 Newtons (N), in a free and uncompressed state. This range is considerably less than the tangential tension residing in piston rings 20 produced by prior art methods. This low tangential tension also allows the piston ring 20 to have a miniscule final gap 50 in comparison to conventional piston rings including prior art dykes-type piston rings. In accordance with the subject invention, the final gap 50 has a gap width 72 measurable between the lateral faces 70 ranging from zero to 0.4 millimeters when the annular ring body 68 is in its free and uncompressed state. In accordance with another aspect of the subject invention, the gap width 72 may range from zero to 0.1 millimeters when the annular ring body 68 is in its free and uncompressed state. These ranges are approximately thirty times smaller than the final gap of conventional piston rings.

The dykes-type piston ring 20 of the subject invention may further include a tail section 38 having various shapes. The side of the tail section 38 may each tapper inwardly to define a keystone shaped cross-section. Alternatively, one of the sides of the tail section may tapper inwardly to define a semi-keystone shaped cross-section. The dykes-type piston ring 20 of the subject invention may further include an outer circumferential surface having a predetermined profile of arcuate shape. The arcuate, or rounded, shape of the predetermined profile may follow a symmetrical or asymmetrical curve. For example, the predetermined profile may follow an asymmetrical curve as shown in FIGS. 5 and 6 where the curve is defined by a pair of arcs 42 converging at a tangent point 44. The arcs 42 can have different radii 46. Alternatively, the predetermined profile 30 may have a flat linear shape arranged along the longitudinal direction or sloped at an angle relative to the longitudinal direction.

Obviously, many modifications and variations of the present invention are possible in light of the above teachings and may be practiced otherwise than as specifically described while within the scope of the appended claims.

What is claimed is:

1. A dykes-type piston ring comprising;
   an annular ring body presenting a generally L-shaped cross-section with a lip section that extends longitudinally relative to said ring body and a tail section with a pair of sides that extends radially inwardly from said lip section,
   said annular ring body having a pair of lateral faces defining a final gap therebetween, and
   said annular ring body having a measurable tangential tension ranging from zero to 25 Newtons in a free and uncompressed state.

2. A dykes type piston ring as set forth in claim 1 wherein said final gap has a gap width measurable between said lateral faces ranging from zero to 0.4 millimeters when said annular ring body is in said free and uncompressed state.

3. A dykes type piston ring as set forth in claim 2 wherein said gap width ranges from zero to 0.1 millimeters when said annular ring body is in said free and uncompressed state.

4. A dykes type piston ring as set forth in claim 1 wherein said pair of sides of said tail section each tapper inwardly to define a keystone shaped cross-section.

5. A dykes type piston ring as set forth in claim 1 wherein one of said pair of sides of said tail section tappers inwardly to define a semi-keystone shaped cross-section.

6. A dykes type piston ring as set forth in claim 1 wherein said annular ring body includes an outer circumferential surface having a predetermined profile of arcuate shape.

* * * * *